(12) United States Patent
Taniguchi

(10) Patent No.: US 6,583,948 B1
(45) Date of Patent: Jun. 24, 2003

(54) DISC RECORDING/REPRODUCING APPARATUS AND SERVO SIGNAL WRITING APPARATUS

(75) Inventor: Kayoko Taniguchi, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/326,276

(22) Filed: Jun. 4, 1999

(30) Foreign Application Priority Data

Jun. 8, 1998 (JP) .......................................... 10-159672
Jun. 8, 1998 (JP) .......................................... 10-159673

(51) Int. Cl.$^7$ ............................................. G11B 21/02
(52) U.S. Cl. ........................................................ 360/75
(58) Field of Search .......................... 360/77.03, 77.08, 360/75

(56) References Cited

U.S. PATENT DOCUMENTS 5,325,349 A * 6/1994 Taniguchi ................. 360/77.03
6,005,667 A * 12/1999 Takamiya et al. ........... 356/499
6,151,185 A * 11/2000 Ishizuka et al. ........... 360/78.04

* cited by examiner

Primary Examiner—Regina N. Holder
Assistant Examiner—Mitchell Slavitt
(74) Attorney, Agent, or Firm—Jay H. Maioli

(57) ABSTRACT

A disc recording and/or reproducing apparatus has a scale movable along with a magnetic head radially of a magnetic disc provided in the disc recording and/reproducing apparatus and which has recorded thereon readable by a laser light position information indicative of the radially moving position of the magnetic head. The position information indicates a smaller range than the radial length of a signal recording area on the magnetic disc. The writing of servo signals to the magnetic disc is done by a servo signal writing apparatus including an optical head disposed movably in a position corresponding to the moving position of the scale to detect the position information recorded on the scale, and a main controller to move the magnetic head radially of the magnetic disc for writing the servo signal to the magnetic disc and to move the optical head correspondingly to a position where the servo signal is to be written. The position where the position information is to be detected is changed by moving the optical head correspondingly to the position where the servo signal is to be written, thereby recording a servo signal to each of all the areas on the magnetic disc. Thus, the disc recording and/or reproducing apparatus and servo signal writing apparatus can implement a high accuracy, high resolution and a low cost in recording servo signals to a disc provided in the disc recording and/or reproducing apparatus.

6 Claims, 12 Drawing Sheets

DISC RECORDING/REPRODUCING APPARATUS AND SERVO SIGNAL WRITING APPARATUS

BACKGROUND OF THE INVENTION

1. Field of the Invention

The present invention relates to a disc recording and/or reproducing apparatus (will be referred to as "disc drive" hereinunder) for recording and/or reproducing data to and/or from a disc-shaped recording medium such as an optical disc, magnetic disc, etc., and more particularly to a disc drive including a servo signal writing apparatus to write servo signals to a disc-shaped recording medium.

Also, the present invention relates to a servo signal writing apparatus used to write servo signals to a disc-shaped recording medium such as an optical disc, magnetic disc, etc.

2. Description of Related Art

Since tracking is controlled during write or read of data to or from a disc in a conventional disc drive such as a hard disc drive, the disc as a recording medium should have previously formed thereon tracks each defining a radial writing position.

Thus, in a disc drive before shipment from the factory, a magnetic head incorporated in the disc drive is used to write tracking servo signals to a disc used in the disc drive to form such tracks on the disc.

However, such a disc drive cannot control the position of the magnetic head if no servo signals are recorded on the disc. To write servo signals to a disc having no signal recorded thereon, a servo signal writing apparatus is used which controls the disc-radial position, etc. of the magnetic head to write servo signals to the disc.

Various servo signal writing apparatus have so far been proposed, of which a typical one is well known which has an encoder installed to a magnetic head holding arm to control the position of the magnetic head to record servo signals to the magnetic disc. In this servo signal writing apparatus, the encoder is installed with a fixing pin to the magnetic head holding arm, and the moving position of the magnetic head is controlled to record the servo signal. Since in this servo signal writing apparatus, the magnetic head holding arm is mechanically connected, however, there will take place a difference in installed condition of the magnetic head holding arm between when the servo signal is recorded on the disc and when the servo signal is used in practice, so that the servo signal can hardly be recorded with an improved accuracy. Also, since the closed disc drive has to be opened for the actual use of the servo signal, the servo signals must be written to the disc in a clean room, which will lead to an increase of manufacturing costs.

Further, in another example of the servo signal writing apparatus, a servo loop is formed for a pit or groove formed in the magnetic head holding arm to follow a laser light emitted from an optical head, and a servo loop is formed to detect, by an encoder, a moving position of the optical head emitting the laser light to control the moving position of the optical head, thereby controlling the moving position of the magnetic head to write servo signals to a disc. Since this apparatus controls the moving position of the magnetic head by the use of the laser light emitted from outside the disc drive, the servo signal can be written with no contact with the magnetic head holding arm. Therefore, different from the above-mentioned apparatus, this apparatus makes it unnecessary to write servo signals to a disc in the clean room or the like. In this servo signal writing apparatus, however, it is necessary to form the two servo loops, one for allowing the magnetic head holding arm to follow the movement of the optical head and the other for controlling the position of the optical head based on a detection output from the encoder. Thus the apparatus can hardly write servo signals with an improved accuracy and at a high speed.

To solve the above-mentioned problems involved in the conventional servo signal writing apparatuses, the Inventor of the present invention had proposed servo signal writing apparatuses as disclosed in the Provisional Publication of the Japanese Patent Application Nos. 4-351766 and 4-351767, respectively. In a hard disc drive comprising a scale provided on a magnetic head holding arm and which has a diffraction grating formed thereon, the servo signal writing apparatus detects the diffraction grating on the scale to write servo signals to the hard disc.

Referring now to FIG. 1, there is illustrated the servo signal writing apparatus proposed by the Inventor of the present invention.

In FIG. 1, the servo signal writing apparatus is generally indicated with a reference 100, and a hard disc drive in which servo signals are written to a disc is generally indicated with a reference 110. The hard disc drive 110 comprises an enclosure 111, and a magnetic disc 112, magnetic head 113, arm 114 and an arm support 115 provided inside the enclosure 111.

As will be seen in FIG. 1, the arm 114 has the magnetic head 113 provided at one end thereof. The arm 114 is installed at the other end thereof to the arm support 115. The arm support 115 has built therein a voice coil motor which will drive the arm 114 when it is supplied with a drive current. As the arm 114 is driven by the voice coil motor provided inside the arm support 115, the arm 114 will be turned about a pivot 114a provided at one end portion thereof in a plane parallel to a signal recording surface of the magnetic disc 112. As the arm 114 turns in this way, the magnetic head 113 will move from the lead-in area toward the lead-out area, for example, of the magnetic disc 112. Thus, the magnetic head 113 is movable radially of the magnetic disc 112 to write data on the entire recording area of the magnetic disc 112. The rotating angle of the arm 114 varies depending upon the length of the arm 114 and size of the magnetic disc 112. The angle of rotation is about 30°, for example.

In the hard disc drive 110, the arm 114 has a scale 116 installed thereon near the base end thereof. As the arm 114 turns, the scale 116 is turned along with the magnetic head 113 in a plane parallel to the magnetic disc 112. The scale 116 has formed thereon a diffraction grating indicating a disc-radial position of the magnetic head 113. The diffraction grating formed on the scale 116 can be read by irradiating a laser light onto the diffraction grating from outside the hard disc drive 110. For example, a portion of the enclosure 111 opposite to the scale 116 is formed from a transparent material such as acryl, glass or the like so that the diffraction grating can be read from outside.

The diffraction grating formed on the scale 116 is recorded over a width L as shown in FIG. 2. The recorded width L is larger than the movable range of a portion of the arm 114 where the scale 116 is provided, so that the diffraction grating can be detected even when the magnetic head 113 has moved from the lead-in area to the lead-out area on the magnetic disc 112 (for example, when the arm 114 turns through an angle of about 30°).

As shown in FIG. 1, the conventional servo signal writing apparatus 100 to write servo signals to the disc in the hard disc drive 110 constructed as in the above, comprises an optical head 101 to irradiate a laser light onto the scale 116 and detect a reflected laser light from the scale 116, thereby detecting the diffraction grating formed on the scale 116, and a control circuit 102 to receive a detection signal from the optical head 101 and produce a magnetic head drive signal and servo signal for use to drive the magnetic head 113 based on the received detection signal.

The optical head 101 irradiates a laser light to the diffraction grating formed on the scale 116. The diffraction grating diffracts the incident laser light. The optical head 101 detects the reflected laser light diffracted by the diffraction grating to detect a phase component of the reflected laser light. As the arm 114 turns, the scale 116 provided thereon also turns along with the arm 114. The phase of the reflected laser light from the diffraction grating varies as the arm 114 turns. Thus, by detecting the phase component, it is possible to detect a disc-radial moving position of the magnetic head 113. The optical head 101 provides the control circuit 102 with the phase component of the reflected laser light as a position signal indicative of the moving position of the magnetic head 113.

Based on the position signal supplied from the optical head 101, the control circuit 102 provides a servo control of the magnetic head 113 to move the latter to a predetermined track position on the magnetic disc 112, and also drives the magnetic head 113 to write the servo signal to the predetermined track position on the magnetic disc 112.

In the hard disc drive 110, the recorded width L of the diffraction grating on the scale 116 is larger than the movable range of a portion of the arm 114 where the scale 116 is provided, as shown in FIG. 2.

Thus, the servo signal writing apparatus 100 can detect the diffraction grating even when the magnetic head 113 has moved from the lead-in area to the lead-out area on the magnetic disc 112. Hence, the magnetic head 113 can be moved over the signal recording area on the magnetic disc 112 to write a servo signal to each of all tracks on the magnetic disc 112.

Since the servo signal writing apparatus 100 proposed by the Invention of the present invention can write servo signals to a magnetic disc without any contact with the hard disc drive 110 as mentioned above, it is not necessary to write servo signals in a clean room. And since two servo loops may not be formed, servo signals can be written with an improved accuracy and at a high speed.

Recently, along with disc recording and/or reproducing apparatuses of larger capacities having been proposed, magnetic discs having a narrower track width have been proposed to cope with the larger capacity of the disc recording and/or reproducing apparatuses. Thus, a servo signal writing apparatus is required which can write servo signals to a magnetic disc with a higher density.

To write servo signals with a higher density by the servo signal writing apparatus 100 proposed by the Inventor of the present invention, the wavelength of the diffraction grating formed on the scale 116 may be shortened to control the position of the magnetic head 113 with a higher resolution, for example. In this case, however, the shorter wavelength of the diffraction scale will result in a larger cost for manufacturing the scale 116.

Further, to write servo signals with a higher density by the servo signal writing apparatus 100 proposed by the Inventor of the present invention without changing the wavelength, etc. of the diffraction grating formed on the scale 116, the scale 116 may be provided on the magnetic head holding arm 114 at a position nearer to the free end of the arm 114, that is, nearer to the magnetic head 113, for example. By locating the scale 116 at a position farther from the pivot 114a of the arm 114, the scale 116 can be turned through a larger angle than the angle through which the arm 114 is turned with the scale 116 disposed nearer to the pivot 114a as previously mentioned. In this case, however, the scale 116 has to be large enough for the diffraction grating formed thereon to be detected even when the magnetic head 113 has been moved from the lead-in area to the lead-out area on the magnetic disc 112 (for example, when the arm 114 is turned through an angle of about 30°).

However, if a large scale 116 is installed on the arm 114, it will add to the total mass of the arm 114. Thus, a large current has to be supplied to the voice coil motor to drive the arm 114, which will increase the power consumption. The increase in mass of the arm 114 will cause the mechanical frequency characteristic to be worse, so that the arm 114 cannot easily be positioned and the time required for data input to the hard disc drive 110 is increased.

SUMMARY OF THE INVENTION

Accordingly, the present invention has an object to overcome the above-mentioned drawbacks of the prior art by providing a disc recording and/or reproducing apparatus adapted to implement a high accuracy, high resolution and a low cost in writing servo signals.

Also the present invention has another object to provide a servo signal writing apparatus adapted to implement a high accuracy, high resolution and low cost in writing servo signals.

The above object can be attained by providing a disc recording and/or reproducing apparatus comprising:

a read/write head to write and/or read a signal to and/or from a disc;

means for holding and moving the read/write head radially of the disc; and a scale adapted to be movable, along with the read/write head provided on the read/write head holding means, radially of the disc and having recorded thereon a position information indicative of a moving position of the read/write head and which is readable from outside;

the position information recorded on the scale indicating a smaller range than the radial length of a signal recording area on the disc.

The disc recording and/or reproducing apparatus writes servo signals to a disc provided therein by controlling, by means of an external apparatus, the disc-radial position of the read/write head based on the position information indicative of the smaller range, recorded on the scale, than the radial length of the signal recording area on the disc.

The above object can be attained also by providing a servo signal writing apparatus for writing servo signals to a disc provided in a disc recording and/or reproducing apparatus comprising a read/write head to write and/or read a signal to and/or from a disc; means for holding and moving the read/write head radially of the disc; and a scale adapted to be movable, along with the read/write head provided on the read/write head holding means, radially of the disc and having recorded thereon a position information indicative of a moving position of the read/write head and which is readable from outside, the servo signal writing apparatus comprising:

means provided movably in a position corresponding to the moving position of the scale to detect the position information;

means for controlling the read/write head moving means correspondingly to the position informed detected by the position information detecting means to move the read/write head radially of the disc in order to write servo signals to the disc; and means for moving the position information detecting means correspondingly to a position on the disc where the servo signal is to be written to change the position where the position information is to be detected by the position information detecting means.

In this servo signal writing apparatus, the position where the position information is to be detected is changed by moving the position information detecting means correspondingly to a position on the disc where the servo signal is to be written, thereby writing a servo signal to each of all the recording areas on a disc provided in the disc recording and/or reproducing apparatus.

Also, the above object can be attained by providing a servo signal writing apparatus for writing servo signals to a disc provided in a disc recording and/or reproducing apparatus comprising a read/write head to write and/or read a signal to and/or from a disc; means for holding and moving the read/write head radially of the disc; and a scale adapted to be movable, along with the read/write head provided on the read/write head holding means, radially of the disc and having recorded thereon a position information indicative of a moving position of the read/write head and which is readable from outside, the servo signal writing apparatus comprising:

a plurality of means provided movably in positions corresponding to the moving positions of the scale to detect the position information; and means for controlling the read/write head moving means correspondingly to the position informed detected by the plurality of position information detecting means to move the read/write head radially of the disc in order to write servo signals to the disc;

the plurality of position information detecting means being used selectively according to the position on the disc where the servo signal is to be written.

In this servo signal writing apparatus, the plurality of position information detecting means is used selectively according to the position on the disc where the servo signal is to be written to detect the position information, thereby writing the servo signal to all the recording areas on the disc in the disc recording and/or reproducing apparatus.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
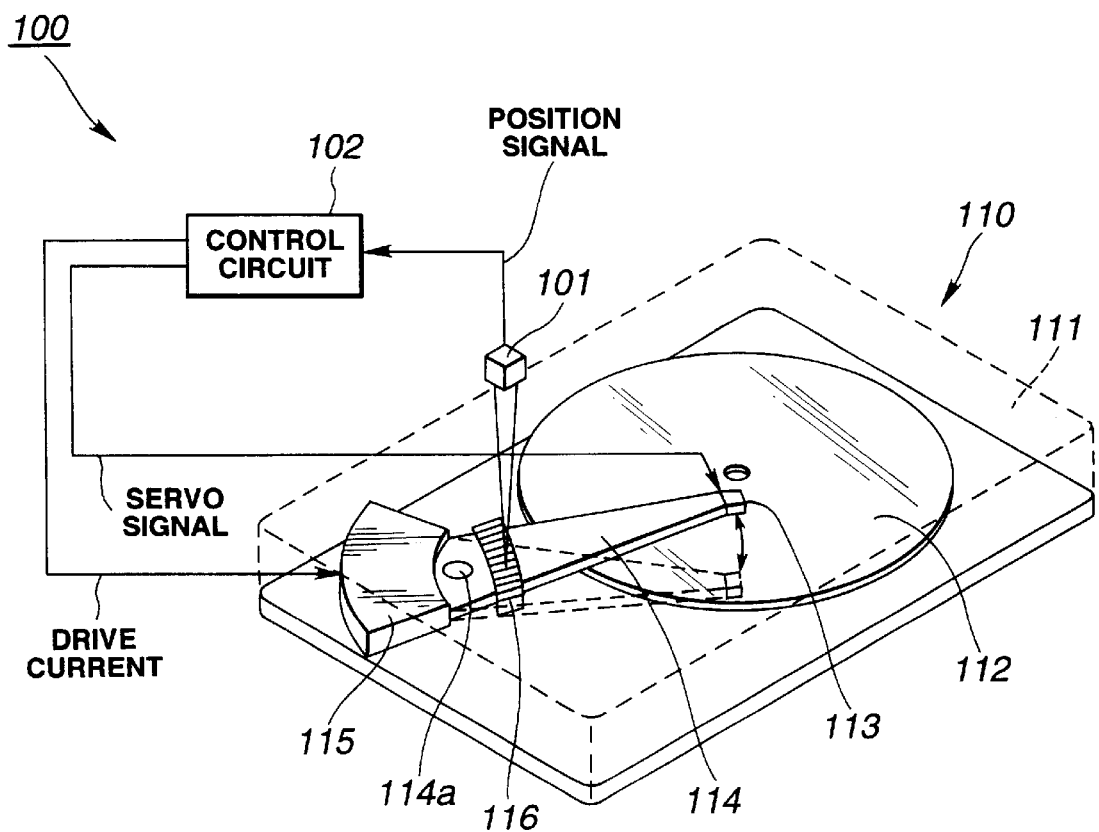
FIG. 1 is a schematic illustration of a conventional servo signal writing apparatus.
Figure 2:
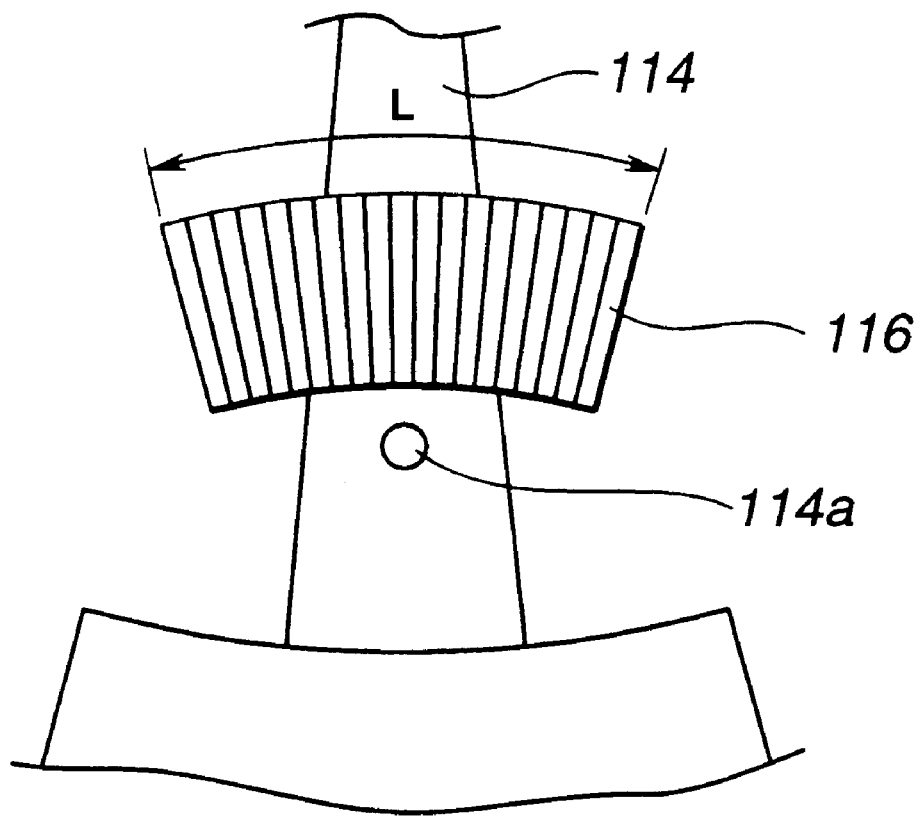
FIG. 2 is also a schematic illustration of a magnetic head holding arm of the conventional disc recording and/or reproducing apparatus in which servo signals are written to disc provided therein by the conventional servo signal writing apparatus in FIG. 1.
Figure 3:
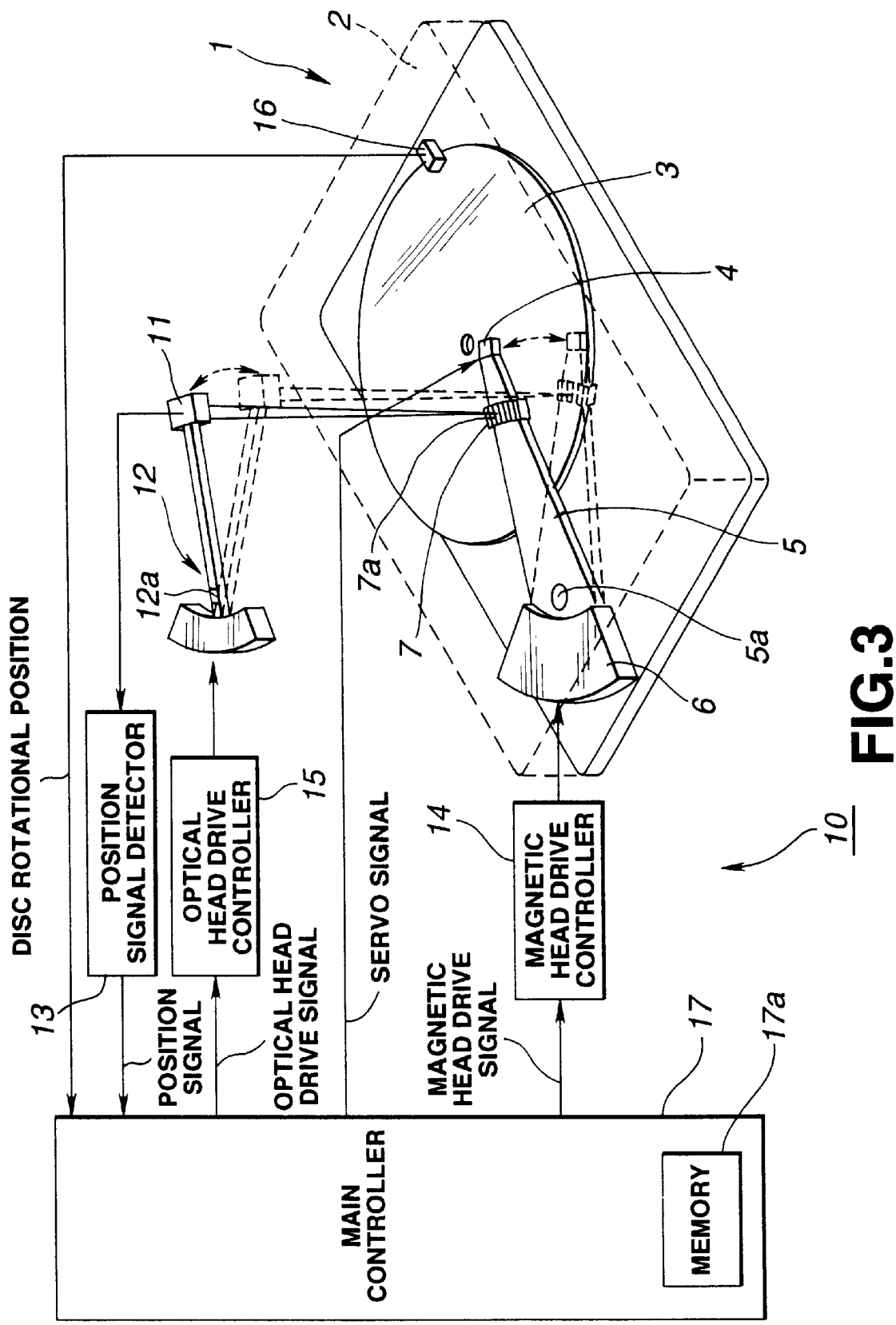
FIG. 3 is a schematic illustration of a disc recording and/or reproducing apparatus and servo signal writing apparatus, both according to the present invention.

Referring now to FIG. 3, the disc recording and/or reproducing apparatus according to the present invention is shown in the form of a perspective view, and the servo signal writing apparatus according to the present invention is shown in the form of a schematic block diagram. The disc recording and/or reproducing apparatus is generally indicated with a reference 1, and the servo signal writing apparatus is generally indicated with a reference 10.

First the disc recording and/or reproducing apparatus 10 will be described herebelow. As shown, the disc recording and/or reproducing apparatus 10 comprises an enclosure 2, and a magnetic disc 3, magnetic head 4, magnetic head holding arm 5 and an arm support 6 provided inside the enclosure 2.

The disc recording and/or reproducing apparatus 10 has provided therein a disc-shaped recording medium, that is, the magnetic disc 3, and writes data to the magnetic disc and/or read data from the magnetic disc 3.

The arm 5 holds at the free end thereof the magnetic head 4 which magnetically writes to the magnetic disc 3 an input signal supplied from outside the disc recording and/or reproducing apparatus 1. The magnetic head holding arm 5 has a pivot 5a provided at a position near the base thereof, and is supported by the arm support 6 to be rotatable about the pivot 5a. The arm support 6 incorporates a voice coil motor, for example. When supplied with a drive current, the voice coil motor drives the arm 5. Thus, the arm 5 is turned about the pivot 5a in a plane parallel to the signal recording surface of the magnetic disc 3 to move the magnetic head 4 held at the free end of the arm 5 in a plane parallel to the signal recording surface of the magnetic disc 3. In this way, the magnetic head 4 can be moved radially of the magnetic disc 3 from the lead-in area to the lead-out area, or vice versa, of the magnetic disc 3, to cover the entire recording surface of the magnetic disc 3 in writing and/or reading data to and/or from the recording surface. Thus, the turning range of the arm 5 is also a range in which the magnetic head 4 can be moved in a plane parallel to the recording surface of the magnetic disc 3 from the lead-in area to the lead-out area on the magnetic disc 3. The arm 5 can be turned through an angle which varies depending upon the length of the arm 5 itself and size of the magnetic disc 3. The arm turning angle is about 30°, for example.

Further, the disc recording and/or reproducing apparatus 1 comprises a scale 7 installed on the arm 5 near the free end of the latter 5, for example. The scale 7 has a diffraction grating 7a formed on a side thereof parallel to the side thereof fixed to the arm 5. As the arm 5 is turned, the scale 7 is turned along with the magnetic head 4 in a plane parallel to the signal recording surface of the magnetic head 3. The diffraction grating 7a provides for a position information indicative of a disc-radially moving position of the magnetic head 4 and which can be detected by means of a laser light irradiated thereon. The diffraction grating 7a formed on the scale 7 can be read from outside the enclosure 2 of the disc recording and/or reproducing apparatus 1. For example, this reading of the diffraction grating 7a can be attained by forming a portion of the enclosure 2 opposite to the diffraction grating 7a on the scale 7 from a transparent material such as acryl or glass.

Figure 4:
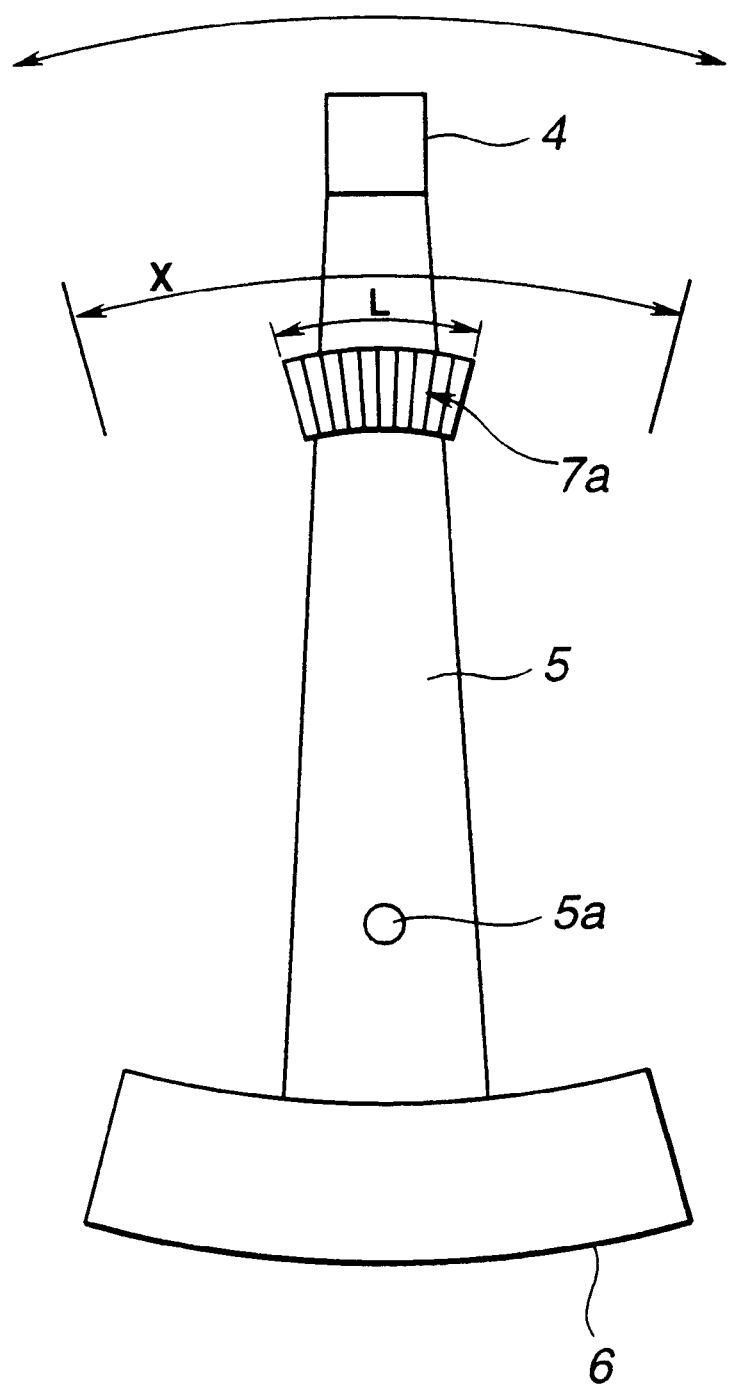
FIG. 4 is a schematic illustration of a magnetic head holding arm of the disc recording and/or reproducing apparatus in FIG. 3.

FIG. 4 is a schematic illustration of a magnetic head holding arm of the disc recording and/or reproducing apparatus in FIG. 3. As seen, the diffraction grating 7a formed on the scale 7 has a width L smaller than a movable range X of the arm 5 at the position thereof where the scale 7 is installed.

In the disc recording and/or reproducing apparatus 1 constructed as in the foregoing, the magnetic head 4 can be moved from the lead-in area to the lead-out area on the magnetic disc 3 or vice versa (the arm 5 can be turned through an angle of about 30°, for example) to fully cover the recording area on the magnetic disc 3 in writing and/or reading data to and/or from the magnetic disc 3.

Next, the servo signal writing apparatus 10 will be described herebelow. As shown in FIG. 3, the servo signal writing apparatus 10 comprises an optical head 11 to irradiate a laser light onto the diffraction grating 7a on the scale 7 and detect a reflected part of the laser light from the diffraction grating 7a, an optical head support 12 to support the optical head 11 to be movable, a position signal detector 13 to generate, based on the detection signal from the optical head 11, a position signal indicative of a moving position of the magnetic head 4, a magnetic head drive controller 14 to drive the arm 5 to move the magnetic head 4, an optical head drive controller 15 to drive the optical head support 12 to move the optical head 11, a clock detecting head 16, and a main controller 17 incorporating a memory 17a.

The optical head 11 irradiates a laser light onto the diffraction grating 7a on the scale 7, detects a reflected part of the laser light from the diffraction grating 7a, and supplies a detection output to the position signal detector 13.

Figure 5:
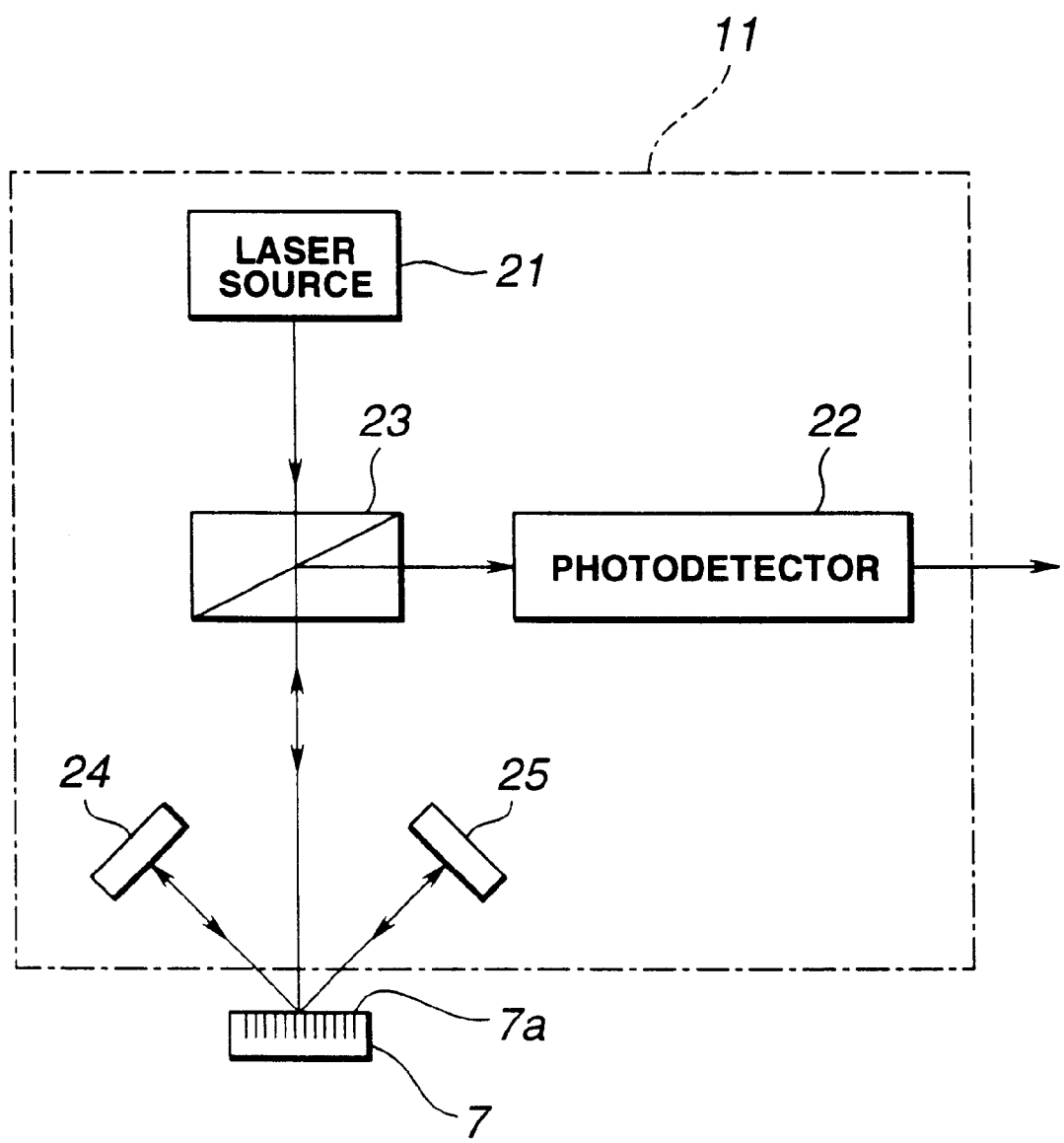
FIG. 5 is a schematic illustration of an optical head of the servo signal writing apparatus in FIG. 3.

Referring now to FIG. 5, there is schematically illustrated the head 11 of the servo signal wiring apparatus 10. As shown, the optical head 11 comprises a laser source 21 to emit a laser light (incident laser light), a photodetector 22 to detect a reflected laser light and convert it to an electrical signal, a beam splitter 23 to pass the incident laser light, project it onto the diffraction grating 7a on the scale 7 and reflect the reflected laser light from the diffraction grating 7a on the scale 7 for projection to the photodetector 22, and two mirrors 24 and 25 to diffract the reflected laser light twice. In the optical head 11 thus constructed, the laser light beams diffracted twice by the two mirrors 24 and 25 interfere with each other to yield a reflected laser light which is to be detected by the photodetector 22.

When the arm 5 is moved, the scale 7 on it is moved along with the magnetic head 4. Thus, the phase of the diffracted reflected laser light from the diffraction grating 7a varies depending upon the disc-radial position of the magnetic head 4. Therefore, by detecting the phase component of the laser light, it is possible to detect the moving position of the magnetic head 4.

As seen from FIG. 3, the optical head 11 is supported by the optical head support 12 and is turned in a plane parallel to the signal recording surface of the magnetic disc 3. The pivot 12a of the optical head 11 is aligned with the pivot 5a of the arm 5, and thus the optical head 11 has a same radius of rotation as the scale 7. Therefore, the optical head 11 is turned to delineate a similar orbit to that of the moving orbit of the scale 7. For this reason, the optical head 11 can be moved to a position where it can irradiate a laser light onto the diffraction grating 7a even when the arm 5 of the disc recording and/or reproducing apparatus 1 is turned. It should be noted that the optical head support 12 moves the optical head 11 to a predetermined position under the control of the main controller 17 which will further be described later.

The position signal detector 13 is supplied with a detection output from the optical head 11. The position signal detector 13 detects a changed phase component from the detection output to determine a disc-radial moving position of the magnetic head 4, and supplies that position as a position signal to the main controller 17.

The magnetic head drive controller 14 is supplied with a magnetic head drive signal from the main controller 17 and supplies the voice coil motor in the arm support 6 with a drive current based on the supplied magnetic head drive signal to drive the arm 5, thereby moving the magnetic head 4 to a predetermined disc-radial position.

The optical head drive controller 15 is supplied with an optical head drive signal from the main controller 17 to drive the optical head support 12 based on the supplied optical head drive signal, to thereby move the optical head 11 to a predetermined position.

The clock detecting head 16 detects, for example, a clock mark previously recorded in the lead-out area of the magnetic disc 3 and which indicates a rotational position of the magnetic disc 3, and supplies a detection signal to the main controller 17.

The main controller 17 is supplied with a position signal from the position signal detector 13 to generate a magnetic head drive signal based on the supplied position signal, and supplies the magnetic head drive signal to the magnetic head drive controller 14 which will then control the magnetic head position by driving the magnetic head 4 to a predetermined position radially of the magnetic disc 3 based on the magnetic head drive signal. Since the servo signal writing apparatus 10 detects a position information indicated by the diffraction grating 7a on the scale 7 and forms a servo loop to drive the arm 5 holding the magnetic head 4, thereby controlling the position of the magnetic disc 3, it can stably control the magnetic head position.

Also, the main controller 17 detects a rotational position of the magnetic disc 3 based on a clock mark detected by the clock detecting head 16, and provides, each time the magnetic disc 3 turns a predetermined angle, a servo signal write control that a servo signal being a predetermined signal pattern is written to the magnetic disc 3. For example, the main controller 17 allows to write servo signals each time the magnetic disc 3 has reached an angle of 45° of turn, thereby writing 8 servo signals per full track.

Further, the main controller 17 supplies an optical head drive signal to the optical head drive controller 15 to control the optical head position by moving the position where the optical head 11 detects the diffraction grating 7a on the scale 7. It should be noted that the main controller 17 may use a position signal detected from the diffraction grating 7a on the scale 7 to control the position of the optical head 11.

Figure 6A:
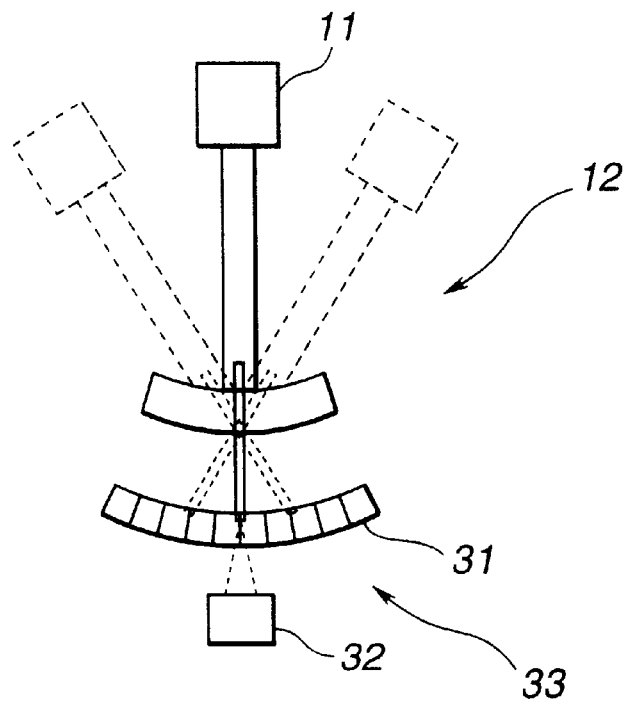
FIG. 6 is a schematic illustration of an optical encoder and sensor to detect the moving position of the optical head in FIG. 5.
Figure 6B:
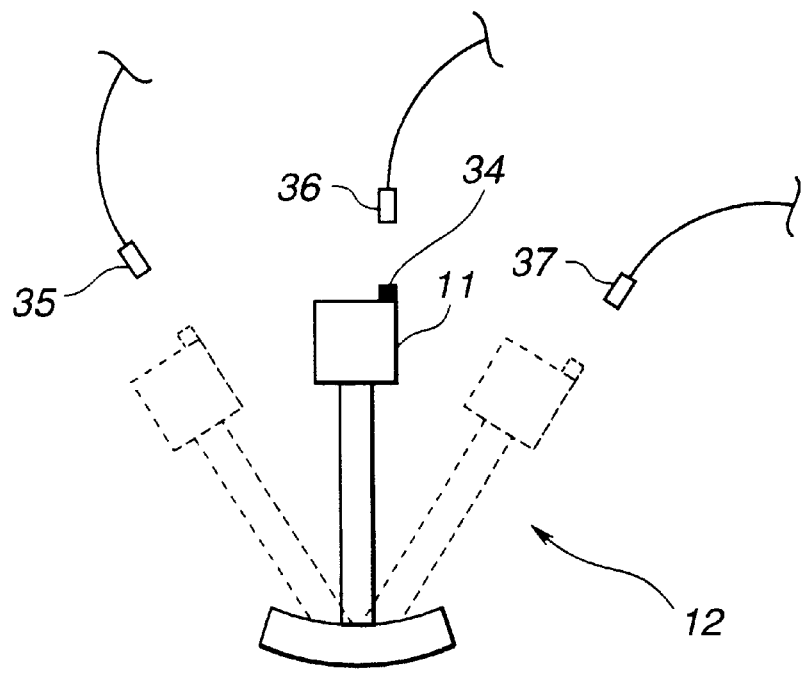

For controlling the position of the optical head 11 in the servo signal writing apparatus 10, an optical encoder or sensors for example may be used to detect the current position and moving distance of the optical head 11. To attain the above purpose, the servo signal writing apparatus may adopt, for example, an optical encoder 33 comprising an optical scale 31 installed on the pivot of the optical head support 12 supporting the optical head 11, and a photodetector 32 which irradiates a laser light to the optical scale 31 and detects the position of the optical head 11, as shown in FIG. 6A. Alternatively, the servo signal writing apparatus 10 may use a plurality of sensors 35, 36 and 37, as shown in FIG. 6B, each of which is responsive to an object 34 provided on the optical head 11 when the object has come to the proximity of the sensor.

Using such an optical encoder or sensors, the servo signal writing apparatus 10 can detect a moving distance of the optical head 11 and control the moving position of the optical head 11 accurately. Different from the conventional servo signal writing apparatus of the previously mentioned double servo loop type, the servo signal writing apparatus 10 according to the present invention has not to control the position of the optical head 11 based on the track pitch of the magnetic disc 3 but can control the position of the optical head 11 without detection of that position.

The servo signal writing apparatus 10 constructed as in the foregoing can move the magnetic head 4 radially of a magnetic disc 3 provided in the disc recording and/or reproducing apparatus 1 and in which no servo signal is yet written at every track pitch, and thus write servo signals supplied from outside to all tracks in the signal recording area on the magnetic disc 3.

The recorded width L of the diffraction grating 7a formed on the scale 7 provided on the arm 5 of the disc recording and/or reproducing apparatus 1 is smaller than the turning distance X of the arm 5 at the portion thereof where the scale 7 is installed. That is, the position information indicated by the diffraction grating 7a formed on the scale 7 does not cover all the disc-radial positions of the magnetic head 4 but indicates only the position information over some of the disc-radial positions of the magnetic head 4. Therefore, the servo signal writing apparatus 10 functions to write a servo signal to each of all tracks in the signal recording area on the magnetic disc 3 as will be described herebelow:

The servo signal writing operations of the servo signal writing apparatus 10 will be described hereunder with reference to FIGS. 7 to 13. FIGS. 7 to 10 and FIGS. 12 to 13 schematically show the magnetic head 4 and scale 7 as if they were in contact with each other. However, it should be noted that this illustration is intended for the convenience of explaining the geometrical relation between the magnetic head 4 and scale 7 in the disc-radial direction and this illustration will not limit the geometrical relation between the magnetic head 4 and scale 7 in the servo signal writing apparatus 10 according to the present invention. This is also true with FIGS. 15 to 17.

Figure 7:
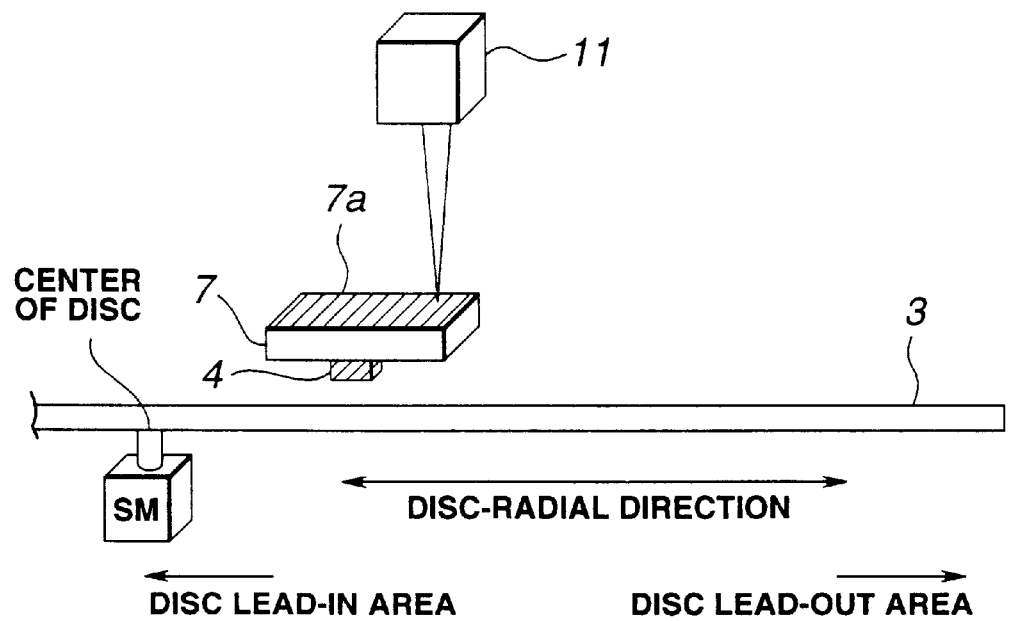
FIG. 7 is an explanatory illustration of operations for servo signal write, by a first embodiment of servo signal writing apparatus according to the present invention, to a disc provided in the disc recording and/or reproducing apparatus.

First as shown in FIG. 7, in the servo signal writing apparatus 10, the magnetic head 4 and scale 7 are moved to the inner edge of the lead-in area on the magnetic disc 3. When the optical head 11 is moved to a position where the laser light is irradiated to the innermost edge of the lead-out area of the magnetic disc 3, the optical head 11 is stopped at that position.

Figure 8:
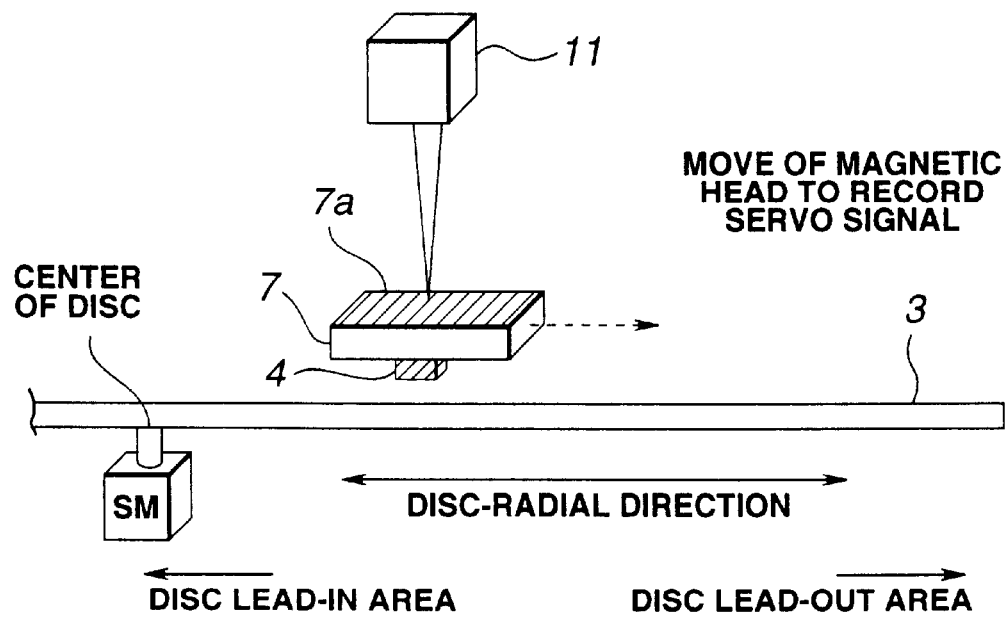
FIG. 8 is also an explanatory illustration of operations for servo signal write, by the first embodiment of servo signal writing apparatus, to the disc in the disc recording and/or reproducing apparatus.

Next, while the optical head 11 is being stopped, the magnetic head 4 and scale 7 are moved towards the lead-out area on the magnetic head 3 as shown in FIG. 8. At this time, the main controller 17 will control the moving position of the magnetic head 4 and scale 7 based on a position signal detected from the diffraction grating 7a to move the magnetic head 4 one by one track pitch. The main controller 17 has the magnetic head 4 write a servo signal to each track while the magnetic head 4 and scale 7 are being moved one by one track pitch.

Figure 9:
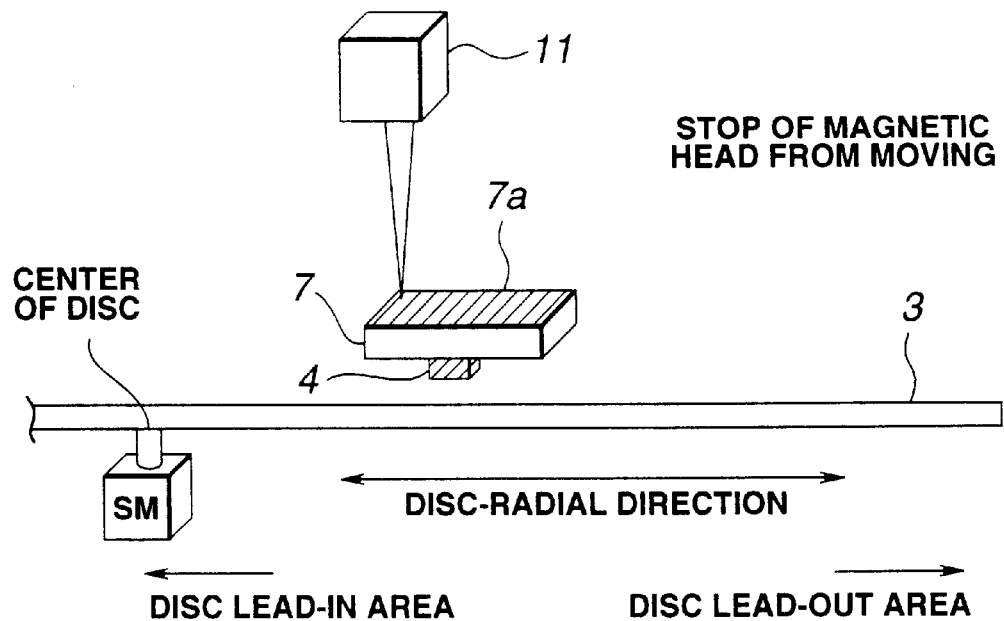
FIG. 9 is an explanatory illustration of operations for servo signal write, by the first embodiment of servo signal writing apparatus, to the disc in the disc recording and/or reproducing apparatus.

Then, when the optical head 11 has arrived at a position where the laser light falls on the inner edge of the scale 7 as shown in FIG. 9, the magnetic head 4 and scale 7 are stopped from moving. The main controller 17 will have the magnetic head 4 stop writing a servo signal once, determine a current position of the disc-radial position of the magnetic head 4 based on the detected position signal, and store the value of the present position into the memory 17a.

Figure 10:
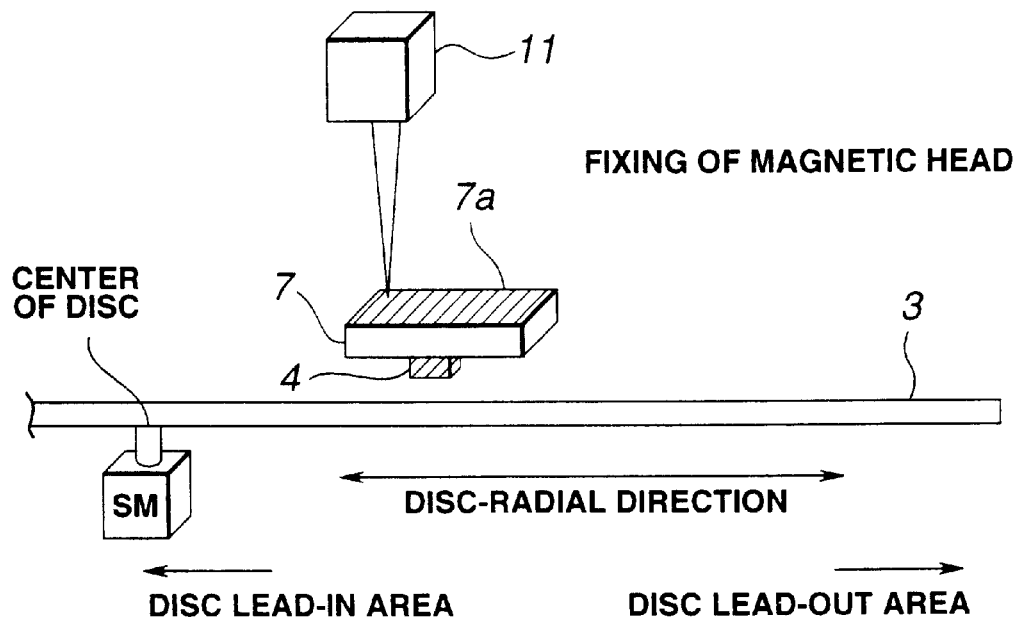
FIG. 10 is also an explanatory illustration of operations for servo signal write, by the second embodiment of servo signal writing apparatus, to the disc in the disc recording and/or reproducing apparatus.
Figure 11:
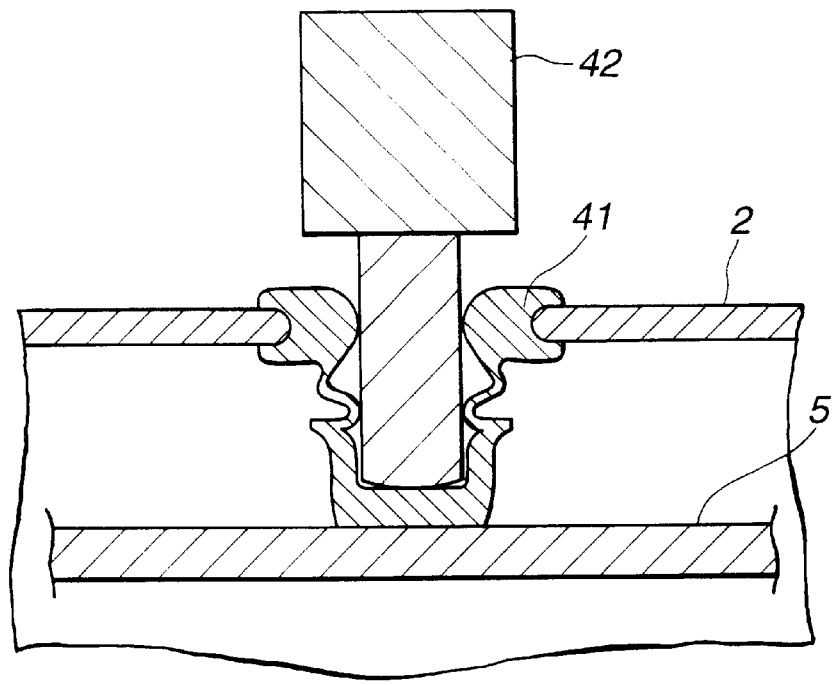
FIG. 11 is an explanatory illustration of means for fixing, at a position, the magnetic head of the disc recording and/or reproducing apparatus.

Thereafter, the magnetic head 4 is fixed electrically or mechanically at the position where it is stopped, as shown in FIG. 10. For example, the servo signal on a last track to which it has been written is detected from the magnetic head 4, and it is used for servo control of the arm 5 to fix the magnetic head 4. That is to say, an ordinary track servo control which is to be effected in writing or reading data to or from the magnetic disc 3, is done with respect to the last track where the servo signal has been written, thereby fixing the magnetic head 4 at the last position where the magnetic head 4 has been stopped. Also, as shown in FIG. 11, the disc recording and/or reproducing apparatus 1 comprises an elastic member 11 formed from a rubber pad or the like provided at a predetermined position of the enclosure 2, and the servo signal writing apparatus 10 comprises an arm fixing pin 42. The arm 5 may be fixed by the elastic member 41 by pressing the latter from outside the enclosure 2 by means of the arm fixing pin 42.

In case the magnetic head 4 is thus fixed mechanically, there is a likelihood that after being fixed, the magnetic head 4 takes a different position from before it is fixed. So, the main controller 17 will detect the position signal again after the magnetic head 4 has been fixed to determine the disc-radial position of the magnetic head 4, and store the position into the memory 17a.

Figure 12:
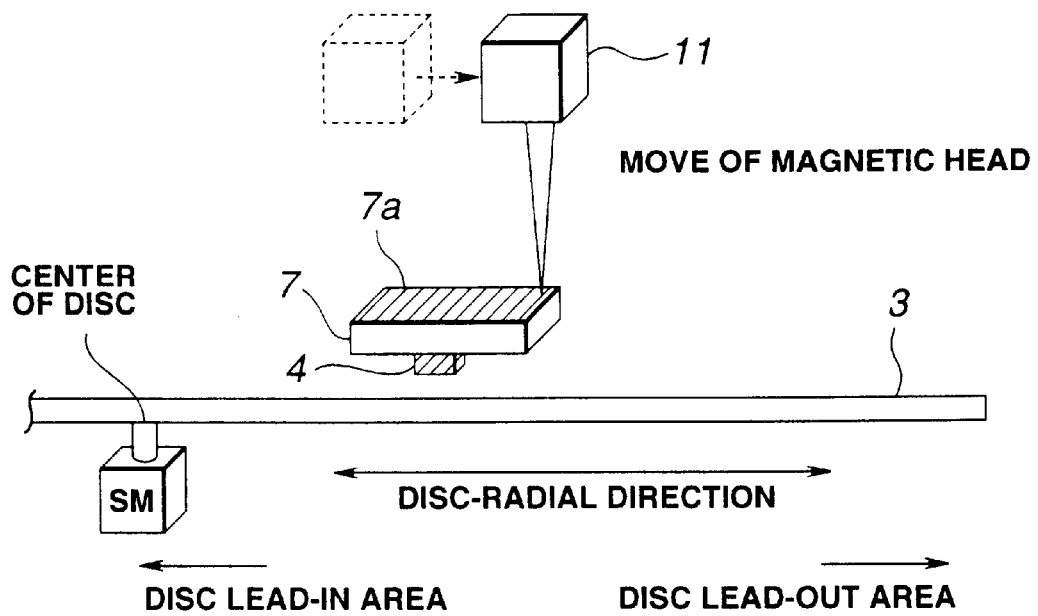
FIG. 12 is also an explanatory illustration of operations for servo signal write, by the first embodiment of servo signal writing apparatus according to the present invention, to a disc provided in the disc recording and/or reproducing apparatus.

After that, the optical head 11 is moved towards the lead-out area on the magnetic disc 3 as shown in FIG. 12. When the optical head has been moved to a position where the laser light falls on the inner edge of the scale 7, it is stopped at that position. When the optical head 11 is thus stopped, the main controller 17 will detect a position signal from the diffraction grating 7a. Then the main controller 17 will read, from the memory 17a, a last disc-radial position of the magnetic head 4 where the servo signal has been written, and re-set the detected position signal in the memory 17a.

Figure 13:
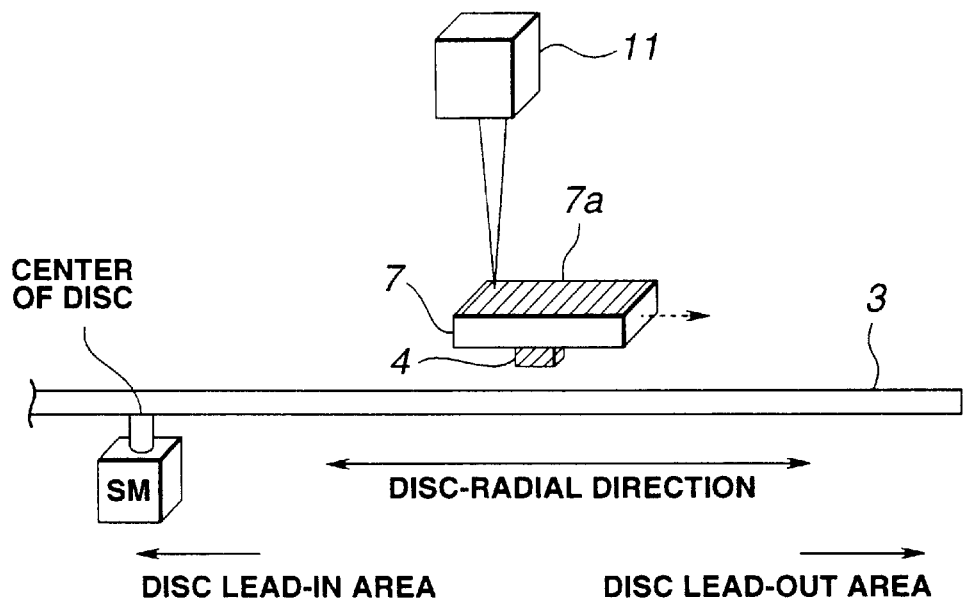
FIG. 13 is also an explanatory illustration of operations for servo signal write, by the first embodiment of servo signal writing apparatus, to the disc in the disc recording and/or reproducing apparatus.

Next, while the optical head 11 is being stopped, the magnetic head 4 is moved towards the lead-out area on the magnetic disc 3 as shown in FIG. 13. The main controller 17 will control the positions of the magnetic head 4 and scale 7 based on a position signal detected from the diffraction grating 7a as well as on the position set in the memory 17a to move the magnetic head 4 and scale 7 one by one track pitch, The main controller 17 will have the magnetic head 4 write a servo signal to each track while the magnetic head 4 and scale 7 are being moved one by one track pitch.

The servo signal writing apparatus 10 moves the scale 7 and optical head 11 repeatedly as in the above to write servo signals down to the last track on the magnetic disc 3. The number of times by which the optical head 11 is moved varies depending upon the ratio between the length of the diffraction scale 7a formed on the scale 7 and the moving distance of the scale 7 when the arm 5 is turned over the magnetic disc 3. In the servo signal writing apparatus 10, the scale 7 may be designed to have approximately a quarter of the radius of the magnetic disc 3 for the optical head 11 to be moved 4 times in total.

Stopping the arm 5 to memorize the scale position and replacing this stored position with the scale count position after the head is moved should preferably be done at the disc's same rotary position according to the clock signal.

As having been described in the foregoing, the servo signal writing apparatus 10 can be controlled from outside the disc recording and/or reproducing apparatus 1 to write a servo signal to each of all tracks in the signal recording area on the magnetic disc 3.

Thus, in the disc recording and/or reproducing apparatus 1 according to the present invention, the scale 7 installed on the arm 5 can be designed compact. Also, in the disc recording and/or reproducing apparatus 1, the scale may be installed near the magnetic head 4.

Therefore, it is possible in the disc recording and/or reproducing apparatus 1 according to the present invention to avoid the degradation, due to the mass of the scale 7, of the mechanical frequency characteristic when the magnetic head 4 is moved, and the increase in power consumption, due to the mass of the scale 7, when the magnetic head 4 is moved, thus permitting to stably control the position of the magnetic head 4 for writing and/or reading data to and/or from the magnetic disc 3. Also, with the servo signal writing apparatus 10 according to the present invention, the accuracy of writing servo signals to the magnetic disc 3 can be prevented from being degraded due to the difference in vibration characteristic between the magnetic head 4 and scale 7, so that servo signals can be written with a high accuracy.

In the servo signal writing apparatus 10, since the scale 7 can be designed small, it can be disposed at a position far from the pivot of the arm 5, thereby allowing the scale 7 to turn more with a same angle of rotation than when it is disposed near the arm pivot. Therefore, the position of the magnetic head 4 can be controlled with a higher resolution when writing servo signals to the magnetic disc 3 which can thus record data with a higher density.

Also with the servo signal writing apparatus 10, since the optical head 11 can be used to read the diffraction grating 7a on the scale 7 from outside, servo signals can be written to the magnetic disc 3 in the disc recording and/or reproducing apparatus 1 in a contactless manner. Hence, it is not necessary to write servo signals to the magnetic disc in a clean room, which leads to a reduced manufacturing cost.

In the foregoing, the present invention has been described concerning the embodiment of disc recording and/or reproducing apparatus 1 in which the magnetic head 4 is used to magnetically write servo signals to the magnetic disc 3. However, the present invention is not limited to this embodiment but it may be applied to an optical disc recording and/or reproducing apparatus in which servo signals have been recorded on the disc. Further the present invention can be applied to a recording and/or reproducing apparatus in which servo signals have been written beforehand by a read/write head in the apparatus and the servo signals already written are used for servo control of the read/write head.

In the disc recording and/or reproducing apparatus 1 according to the present invention, the magnetic head 4 is turned by the arm 5. However, the means for moving the magnetic head 4 is not limited to such an arm 5. For example, the magnetic head 4 may be moved using a so-called sliding member which can move it straightly radially of the magnetic disc 3. In this case, the scale 7 is installed to the sliding member in such a manner that the recorded direction of the diffraction grating 7a is parallel to the moving direction of the sliding member.

In the disc recording and/or reproducing apparatus 1 having been described in the foregoing, the clock detecting head 16 is used to detect a clock mark recorded in the lead-out area on the magnetic disc 3 to detect the rotational position of the magnetic disc 3. However, the rotational position of the magnetic disc 3 may be detected by any other means. For example, a clock may be generated based on the rotation information of the spindle motor which drives to spin the magnetic disc 3 to detect the rotational position of the magnetic disc 3.

In the disc recording and/or reproducing apparatus 1, when the optical head 11 is moved for detecting another position, the servo signal write is stopped once. Therefore, a servo signal is to be written to each predetermined area separated radially of the magnetic disc 3 in the disc recording and/or reproducing apparatus 1. In the disc recording and/or reproducing apparatus 1, to avoid an overwrite of servo signals due to a misalignment between the optical head 11 and magnetic head 4, the distance between a last track to which a servo signal has been written before the optical head 11 is moved and a last track to which a servo signal has been written after the optical head 11 is moved, may be made longer than those between the other tracks.

In the servo signal writing apparatus 10, since the arm 5 is driven from outside to control the position of the magnetic head 4, the disc recording and/or reproducing apparatus 10 may be provided with a terminal for supplying a drive current to the voice coil motor which drives the arm 5.

Also, as having been described in the foregoing, servo signals are written to the magnetic disc 3 beginning with the lead-in area. However, the direction of servo signal recording to the magnetic disc 3 is not limited to the direction from the lead-in area to lead-out area, but it may be a direction from the lead-out area to lead-in area on the magnetic disc 3.

Next, a variant of the servo signal writing apparatus 10 will be described below with reference to FIG. 14. The variant is generally indicated with a reference 50.

As shown, the servo signal writing apparatus 50 comprises a plurality of optical heads 51, 52 and 53 in place of the optical head 11 and optical head support 12 to movably support the optical head 11.

The optical heads 51, 52 and 53 are fixed by a support (not shown), for example. The optical heads 51, 52 and 53 are turned about a same center of rotation as that of the scale 7, and they are disposed on circles that are also the moving orbits of the scale 7. The optical heads 51, 52 and 53 are spaced by a distance I which is smaller than the width L of the diffraction grating 7a formed on the scale 7.

Figure 14:
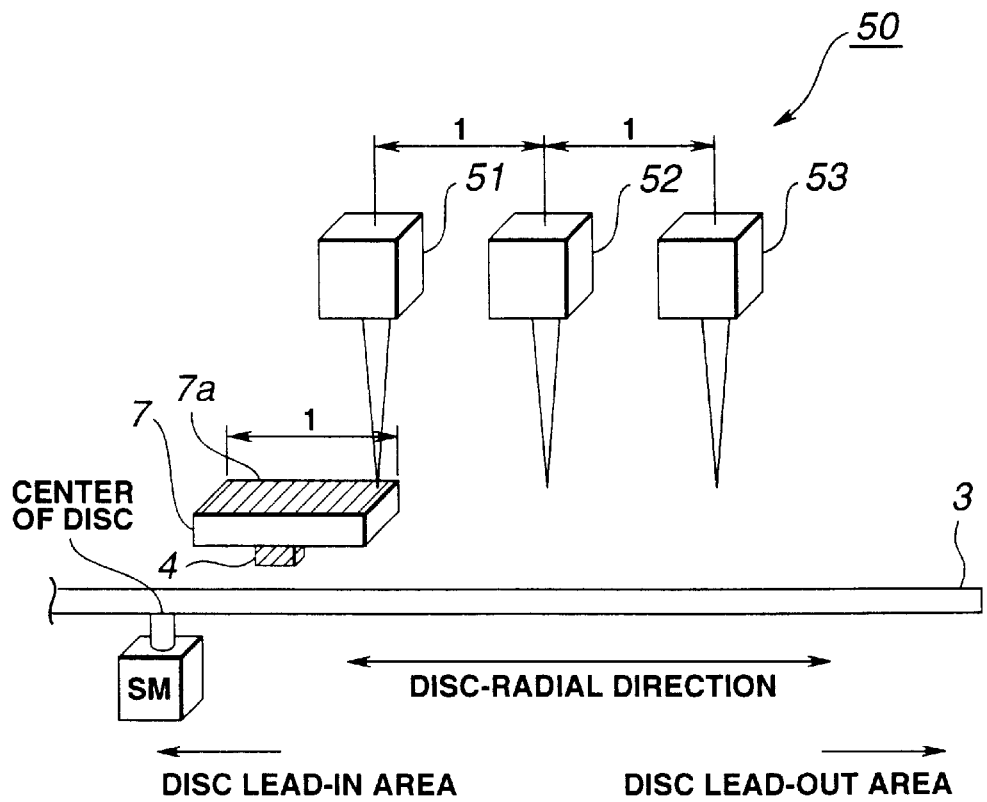
FIG. 14 is an explanatory illustration of operations for servo signal write, by a second embodiment of servo signal writing apparatus according to the present invention, to a disc provided in the disc recording and/or reproducing apparatus.

As shown in FIG. 14, the optical heads 51, 52 and 53 are disposed in this order for example from the lead-in area on the magnetic disc 3. In this case, first the main controller 17 will move the magnetic bead 4 to the innermost track on the magnetic disc 3 and then write a servo signal to the track while detecting the position of the magnetic head 4 by the use of the optical head 51. Next, the main controller 17 will judge whether the laser light irradiated from the optical head 51 has moved to the inner edge of the scale 7. When it determines that the laser light has moved to that edge, it will switch the optical disc 51 to the optical disc 12. At this time, the optical head 52 is irradiating the laser light to the outer edge of the scale 7. Thereafter, the main controller 17 will have the magnetic head 4 write a servo signal while detecting the position of the magnetic head 4 by the use of the optical head 52.

By repetition of the above control, the servo signal writing apparatus 50 can detect the position of the magnetic head 4 by sequentially irradiating the laser beams from the optical heads 51, 52 and 53 to the diffraction grating 7a on the scale 7 even when the arm 5 of the disc recording and/or reproducing apparatus 1 is turned.

Therefore, similarly to the use of the servo signal writing apparatus 10, using the servo signal writing apparatus 50 makes it possible to design small the scale 7 which is to be installed to the arm 5 of the disc recording and/or reproducing apparatus 1. The scale 7 can be provided near the magnetic head 4.

Furthermore, in the servo signal writing apparatus 50, it is not necessary to control the movement of the optical heads, which thus simplifies the control.

Figure 16:
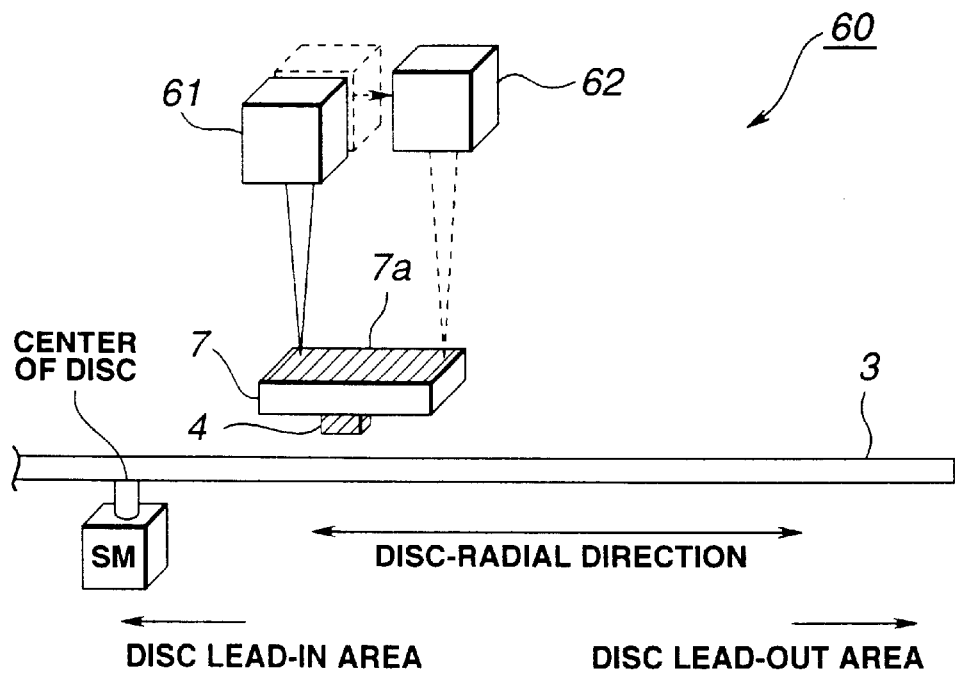
FIG. 16 is an explanatory illustration of operations for servo signal write, by the second embodiment of servo signal writing apparatus, to the disc provided in the disc recording and/or reproducing apparatus.
Figure 17:
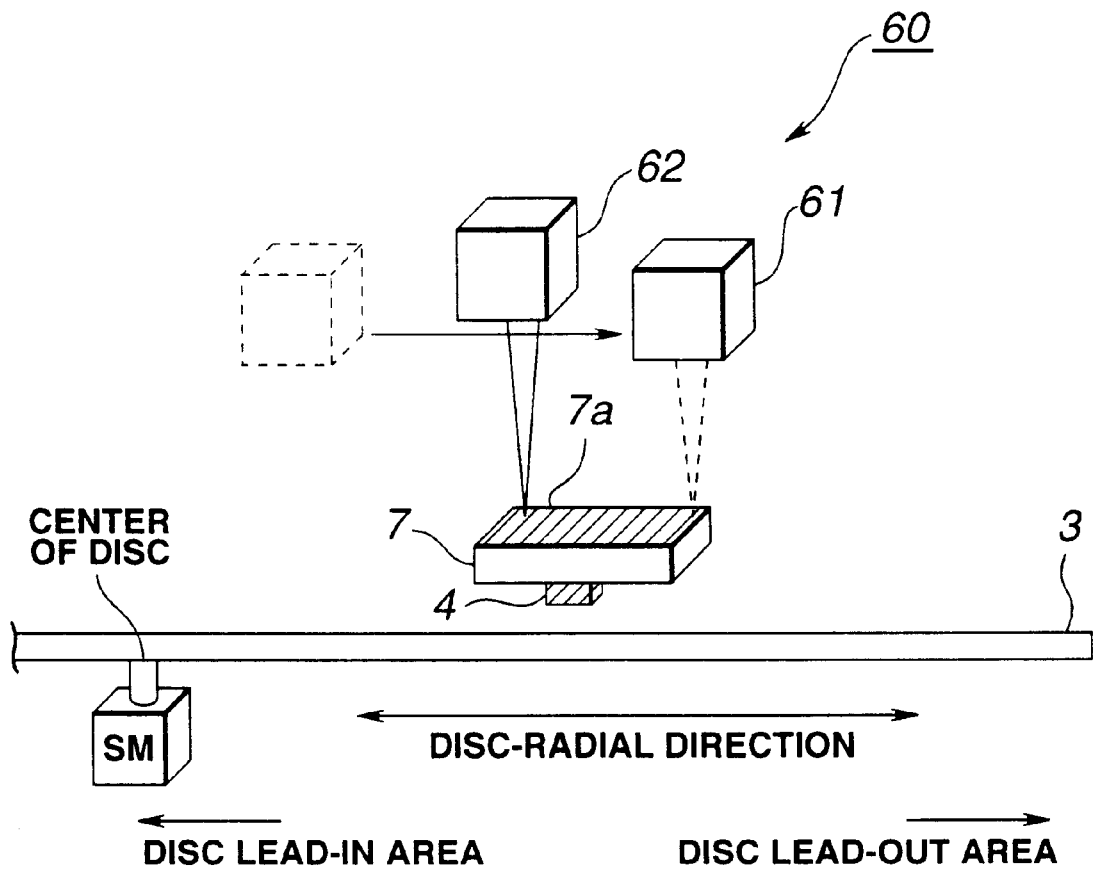
FIG. 17 is an explanatory illustration of operations for servo signal write, by the second embodiment of servo signal writing apparatus, to the disc provided in the disc recording and/or reproducing apparatus.

Next, a further variant of the servo signal writing apparatus 10 will be described herebelow with reference to FIGS. 15 to 17. The variant of the servo signal writing apparatus is generally indicated with a reference 60.

The servo signal writing apparatus 60 comprises two optical heads 61 and 62 and two optical head supports (not shown) to movably support the optical heads 61 and 62, respectively, in place of the optical head 11 and the optical head support 12 to movably support the optical head 11.

Each of the optical heads 61 and 62 is supported by each of the optical head supports and turned in a plane parallel to the signal recording surface of the magnetic disc 3. The optical heads 61 and 62 are turned about the center of rotation of the arm 5 along orbits generally same as that of the scale 7. Namely, both the optical heads 61 and 62 are turned delineating similar orbits to that of the scale 7. Thus, with these optical heads 61 and 62, the laser light from them can be moved to a position where the laser light can be irradiated to the diffraction grating 7a on the scale 7 even when the arm 5 of the disc recording and/or reproducing apparatus 1 is turned. Note that the two optical heads 61 and 62 are turned without any mechanical interference with each other and along different orbits so that both can irradiate the laser beams to the scale 7.

Figure 15:
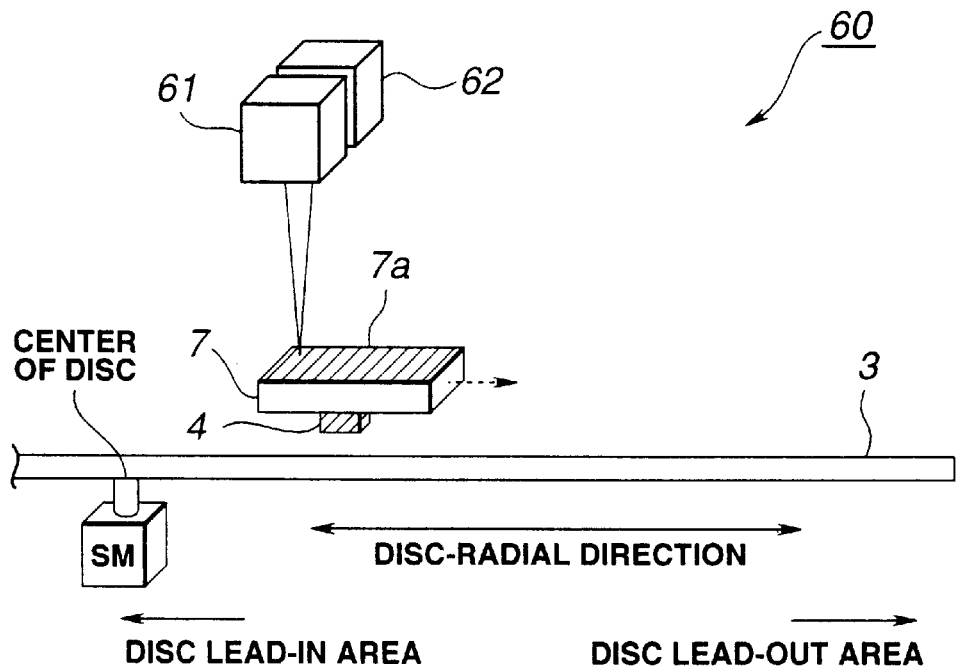
FIG. 15 is an explanatory illustration of operations for servo signal write, by the second embodiment of servo signal writing apparatus, to the disc provided in the disc recording and/or reproducing apparatus.

For the servo signal writing apparatus 60 to write servo signals to the magnetic disc 3, the main controller 17 will first move the magnetic head 4 and scale 7 to the innermost track on the magnetic disc 3 as shown in FIG. 15. Then it will have the magnetic head 4 write a servo signal to the track while detecting the position of the magnetic head 4 by the use of the optical head 61. When the main controller 17 determines that the laser light irradiated from the optical head 61 has moved to the inner edge of the scale 7, it will stop the magnetic head 4 and scale 7 from moving to stop the servo signal write once. Then, the main controller 17 will control the arm 5 based on a position signal obtained by irradiating the laser light from the optical head 61, to fix the magnetic head 4. With the magnetic head 4 fixed, the main controller 17 will move the optical head 62 to a position where the optical head 62 can irradiate the laser light to the outer edge of the scale 7 as shown in FIG. 16.

Next, the main controller 17 will switch the optical head 61 to the optical head 62 to irradiate a laser light. Then the main controller 17 will write a servo signal while detecting the position of the magnetic head 4 by the optical head 62. When the laser light emitted from the optical head 62 has moved to the inner edge of the scale 7 as shown in FIG. 17, the main controller 17 will stop the magnetic head 4 and scale 7 from moving to stop the servo signal write once and fix the magnetic head 4 by the use of the optical head 62. While the magnetic head 4 is fixed using the optical head 62, the main controller 17 will move the optical head 61 to a position where the laser light from the optical head 61 can be irradiated to the outer edge of the scale 7.

By repetition of the above control, the servo signal writing apparatus 60 can detect the position of the magnetic head 4 by sequentially irradiating the laser beams from the optical heads 61 and 62 to the diffraction grating 7a on the scale 7 even when the arm 5 of the disc recording and/or reproducing apparatus 1 is turned.

Therefore, similar to the use of the servo signal writing apparatus 10, using the servo signal writing apparatus 60 makes it possible to design small the scale 7 which is to be installed to the arm 5 of the disc recording and/or reproducing apparatus 1. The scale 7 can be provided near the magnetic head 4.

Also, with the servo signal writing apparatus 60, when one of the optical heads 61 and 62 is being moved, the magnetic head 4 can be fixed by the user of another optical head not being moved.

The servo signal writing apparatus 60 uses two optical heads 61 and 62. However it should be noted that the number of the optical heads is not limited to two but the apparatus 60 may use three more optical heads.

In the disc recording and/or reproducing apparatus according to the present invention, the disc-radial position of the read/write head is controlled by an external apparatus based on a position information recorded in a smaller range of the scale than the radial length of the signal recording area of the disc, to write servo signals to the disc.

Thus in the disc recording and/or reproducing apparatus according to the present invention, the scale can be designed small and installed near the read/write head. Therefore, in the disc recording and/or reproducing apparatus, the mechanical frequency characteristic of the read/write head can be stabilized, the drive current for driving the read/write head moving means, and thus it is possible to minimize a difference between the read/write head and scale, caused by a vibration at the time of writing servo signals to the disc.

Also in the disc recording and/or reproducing apparatus according to the present invention, in case the read/write head moving means is to be turned, the scale is installed near the read/write head, thereby permitting to further stabilize the mechanical frequency characteristic of the read/write head.

Further the disc recording and/or reproducing apparatus according to the present invention, since the position information can be read from outside, servo signals can be recorded with no contact with an external apparatus.

As having been described in the foregoing, the disc recording and/or reproducing apparatus according to the present invention, can record servo signals with a high resolution and accuracy and it can be manufactured with less costs.

Also, in the servo signal writing apparatus, the position detecting means is moved correspondingly to a position on the disc where a servo signal is to be written to change the position where a position information is to be detected, thereby writing servo signals to the entire recording area on the disc in the disc recording and/or reproducing apparatus. In this servo signal writing apparatus, the position information detecting means are selected according to a position on the disc where a servo signal is to be written to detect a position information, thereby writing servo signals to the entire recording area of the disc in the disc recording and/or reproducing apparatus.

Thus the servo signal writing apparatus according to the present invention can write servo signals to the disc in the disc recording and/or reproducing apparatus in which the scale can be designed small and installed near the read/write head. Therefore, in the disc recording and/or reproducing apparatus, the mechanical frequency characteristic of the read/write head can be stabilized, the drive current for driving the read/write head moving means, and thus it is possible to minimize a difference between the read/write head and scale, caused by a vibration at the time of writing servo signals to the magnetic disc.

Also in case the read/write head moving means of the disc recording and/or reproducing apparatus is to be turned, the servo signal writing apparatus according to the present invention can write servo signals to the disc in the disc recording and/or reproducing apparatus in which the scale is installed near the read/write head. Thus, in writing servo signals, the servo signal writing apparatus can control the position of the read/write head with a high resolution and further stabilize the mechanical frequency characteristic of the read/write head.

Further, in the servo signal writing apparatus, since the position information readable from outside is detected by the position information detecting means, servo signals can be recorded with no contact with the disc recording and/or reproducing apparatus.

As having been described in the above, the servo signal writing apparatus, can record servo signals to the disc in the disc recording and/or reproducing apparatus with a high resolution and accuracy and it can be manufactured with less costs.

What is claimed is:

1. A disc recording and/or reproducing apparatus, comprising:

a read/write head to write and/or read a signal to and/or from a disc;

means for holding and moving the read/write head radially relative to the disc;

a scale adapted to be movable radially relative to the disc along with the read/write head provided on the means for holding and moving and having recorded thereon position information indicative of a moving position of the read/write head and which is readable by a position information detecting means, wherein the position information recorded on the scale indicating a smaller range than a radial length of a signal recording area on the disc; and means for fixing the read/write head of the disc recording and/or reproducing apparatus while the position information detecting means is being moved.

2. The disc recording and/or reproducing apparatus as set forth in claim 1:

wherein the disc has servo signals recorded thereon corresponding to the position information recorded on the scale.

3. The disc recording and/or reproducing apparatus as set forth in claim 2, wherein the disc has a servo signal written in each of a plurality of predetermined areas radially separated thereon.

4. A servo signal writing apparatus for writing servo signals to a disc provided in a disc recording and/or reproducing apparatus having a read/write head to write and/or read a signal to and/or from a disc; means for holding and moving the read/write head radially relative to the disc; and a scale adapted to be movable relative to the disc along with the read/write head provided on the means for holding and moving the read/write head and having recorded thereon position information indicative of a moving position of the read/write head and which is readable by a user from outside the apparatus, the servo signal writing apparatus comprising:

position information detecting means provided movably in a position corresponding to a moving position of the scale to detect the position information;

means for controlling the means for holding and moving the read/write head corresponding to the position information detected by the position information detecting means to move the read/write head radially relative to the disc in order to write a servo signal to the disc;

means for moving the position information detecting means to a position on the disc where the servo signal is to be written; and means for fixing the read/write head of the disc recording and/or reproducing apparatus while the position information detecting means is being moved.

5. A servo signal writing apparatus for writing servo signals to a disc provided in a disc recording and/or reproducing apparatus comprising a read/write head to write and/or read a signal to and/or from a disc; means for holding and moving the read/write head radially relative to the disc; and a scale adapted to be movable radially relative to the disc along with the read/write head provided on the means for holding and moving the read/write head and having recorded thereon position information indicative of a moving position of the read/write head and which is readable from outside the apparatus, the servo signal writing apparatus comprising:

position information detecting means provided movably in positions corresponding to respective moving positions of the scale to detect the position information;

means for controlling the means for holding and moving the read/write head corresponding to the position information detected by the position information detecting means to move the read/write head radially relative to the disc in order to write a servo signal to the disc, wherein the position information detecting means being used selectively according to a position on the disc whereat the servo signal is to be written; and means for fixing the read/write head of the disc recording and/or reproducing apparatus while the position information detecting means is being moved.

6. The servo signal writing apparatus as set forth in claim 4 or 5, wherein the means for controlling the means for holding and moving the read/write head corrects, when the position information detecting means is moved so that the position where the position information is to be detected is changed, the moving position of the read/write head based on the moving distance of the position information detecting means, and writes the servo signal to the disc.

* * * * *